United States Patent [19]

Sekine

[11] Patent Number: 5,357,442
[45] Date of Patent: Oct. 18, 1994

[54] SEWING DATA PROCESSING APPARATUS

[75] Inventor: Kiyokazu Sekine, Kuwana, Japan

[73] Assignee: Brother Kogyo Kabushiki Kaisha, Nagoya, Japan

[21] Appl. No.: 177,788

[22] Filed: Jan. 5, 1994

Related U.S. Application Data

[63] Continuation of Ser. No. 794,519, Nov. 19, 1991, abandoned.

[30] Foreign Application Priority Data

Dec. 29, 1990 [JP] Japan .................................. 2-415838

[51] Int. Cl.⁵ .................................................. G06F 15/46
[52] U.S. Cl. ................................ 364/470; 112/121.11; 112/121.12
[58] Field of Search ........................ 112/121.11, 121.12, 112/452, 121.13, 157, 443, 159, 444, 445, 103, 262.3; 364/470

[56] References Cited

U.S. PATENT DOCUMENTS

| 4,915,041 | 4/1990 | Takenoya et al. | 112/121.12 |
| 4,953,483 | 9/1990 | Brower et al. | 112/121.12 |
| 4,953,485 | 9/1990 | Brower et al. | 112/121.12 |

Primary Examiner—Jerry Smith
Assistant Examiner—Cameron H. Tousi
Attorney, Agent, or Firm—Oliff & Berridge

[57] ABSTRACT

A sewing data processing apparatus including a storing device storing stitch data indicative of stitch positions adapted to be penetrated by a sewing needle, a producing device producing data indicative of a defining line, and a modifying device modifying the stitch data such that at least a portion of the stitch positions are located on the defining line.

13 Claims, 7 Drawing Sheets

SEWING DATA PROCESSING APPARATUS

This is a continuation of application Ser. No. 07/794,519 filed Nov. 19, 1991, now abandoned.

BACKGROUND OF THE INVENTION

1. Field of the Invention

The present invention relates to a sewing data processing apparatus and in particular to the art of modifying stitch data indicative of stitch positions to be penetrated by a sewing needle.

2. Related Art Statement

Sewing is effected by moving a work fabric and a sewing needle relative to each other according to stitch data indicative of stitch positions to be penetrated by a sewing needle. However, the stitch data may not be suitable for a particular fabric because the stitch data may fail to provide stitches or a pattern having excellent external appearance matched with the fabric. For solving this problem, it has been practiced to indicate, on a display such as a cathode ray tube (CRT), points representing stitch positions, and straight line segments representing stitches connecting between the stitch positions in a sewing sequence, prior to commencement of the sewing operation, thereby allowing an operator to select one or more stitch positions and move the selected stitch positions to desired stitch positions.

However, in the above manner of modification of the stitch data, the operator is required to actually move, on the display, all the stitch positions to be modified, one by one, to corresponding new stitch positions. This work is very cumbersome and time-consuming.

SUMMARY OF THE INVENTION

It is therefore an object of the present invention to provide a sewing data processing apparatus which modifies stitch data with high efficiency.

The above object has been achieved by the present invention, which provides a sewing data processing apparatus comprising (a) storing means for storing stitch data indicative of stitch positions adapted to be penetrated by a sewing needle, (b) producing means for producing data indicative of a defining line, and (c) modifying means for modifying the stitch data such that at least a portion of the stitch positions are located on the defining line.

In the sewing data processing apparatus constructed as described above, when it is necessary to modify the stitch data, the producing means produces data indicative of a defining line, and the modifying means modifies the stitch data such that at least a portion of the stitch positions are located on the defining line. The defining line provided by the producing means assures that stitches are formed with excellent external appearance as desired by the operator. The modifying means automatically modifies or moves individual stitch positions to new stitch positions on the defining line.

For automatically moving stitch positions to corresponding new stitch positions on the defining line, at least two positions are used to provide the defining line. It is much easier to produce data indicative of the defining line than to move stitch positions to be modified, one by one. Thus, the present processing apparatus modifies stitch data very easily and quickly, i.e., with high efficiency.

According to a preferred feature of the present invention, the producing means comprises display means for displaying points representing the stitch positions and straight line segments connecting between the points in a sewing order.

According to another feature of the present invention, the storing means stores batches of stitch data, each of the batches of stitch data indicating stitch positions constituting a corresponding sewing pattern, the producing means comprising means for selecting one of the sewing patterns indicated by the batches of stitch data, the display means displaying points and straight line segments representing the selected sewing pattern.

According to yet another feature of the present invention, the producing means comprises means for selecting a first stitch position from the stitch positions stored by the storing means, means for selecting a second stitch position from the stitch positions, and means for locating at least one base position between the first and second stitch positions.

According to a further feature of the present invention, the producing means further comprises means for storing data indicative of the first and second stitch positions and the at least one base position.

In a preferred embodiment of the present invention, the at least one base position consist of two base positions, the producing means further comprising means for determining a cubic spline function line so as to pass through the first and second stitch positions and the two base positions.

In another embodiment of the present invention, the producing means further comprises changing means for changing the at least one base position to at least one defining position, and determining means for determining the defining line so as to pass through the first and second stitch positions and the at least one defining position.

In yet another embodiment of the present invention, the at least one base position consist of two base positions, the changing means changing at least one of the two base positions to at least one defining position, the determining means determining a cubic spline function line so as to pass through the first and second stitch positions and the at least one defining position.

In a further embodiment of the present invention, the determining means determines, as the defining line, a straight line connecting between each pair of adjacent positions of the first and second stitch positions and the at least one defining position.

According to another feature of the present invention, the modifying means comprises selecting means for selecting, as the at least portion of the stitch positions, stitch positions located between the first and second stitch positions, according to a predetermined rule, and determining a number of the selected stitch positions as a first number, calculating means for determining a distance between the first and second stitch positions, determining a second number based upon the first number, and calculating a regular interval by dividing the distance by the second number, and means for locating new stitch positions on the defining line by utilizing the regular interval and at least one of the first and second stitch positions, and replacing the selected stitch positions by the new stitch positions.

According to yet another feature of the present invention, the storing means stores, as the stitch data, an X and a Y coordinate of each of the stitch positions, the selecting means selecting the stitch positions located between the first and second stitch positions, such that the selected stitch positions are located between the greater and smaller X coordinates of the first and second stitch positions and simultaneously between the greater and smaller Y coordinates of the first and second stitch positions, and within a predetermined distance from the defining line, the calculating means determining the second number by adding one to the first number.

BRIEF DESCRIPTION OF THE DRAWINGS

The above and optional objects, features and advantages of the present invention will be better understood by reading the following detailed description of considered in conjunction with the accompanying drawings, in the presently preferred embodiment of the invention when which.

DETAILED DESCRIPTION OF THE PREFERRED EMBODIMENT

Figure 1:
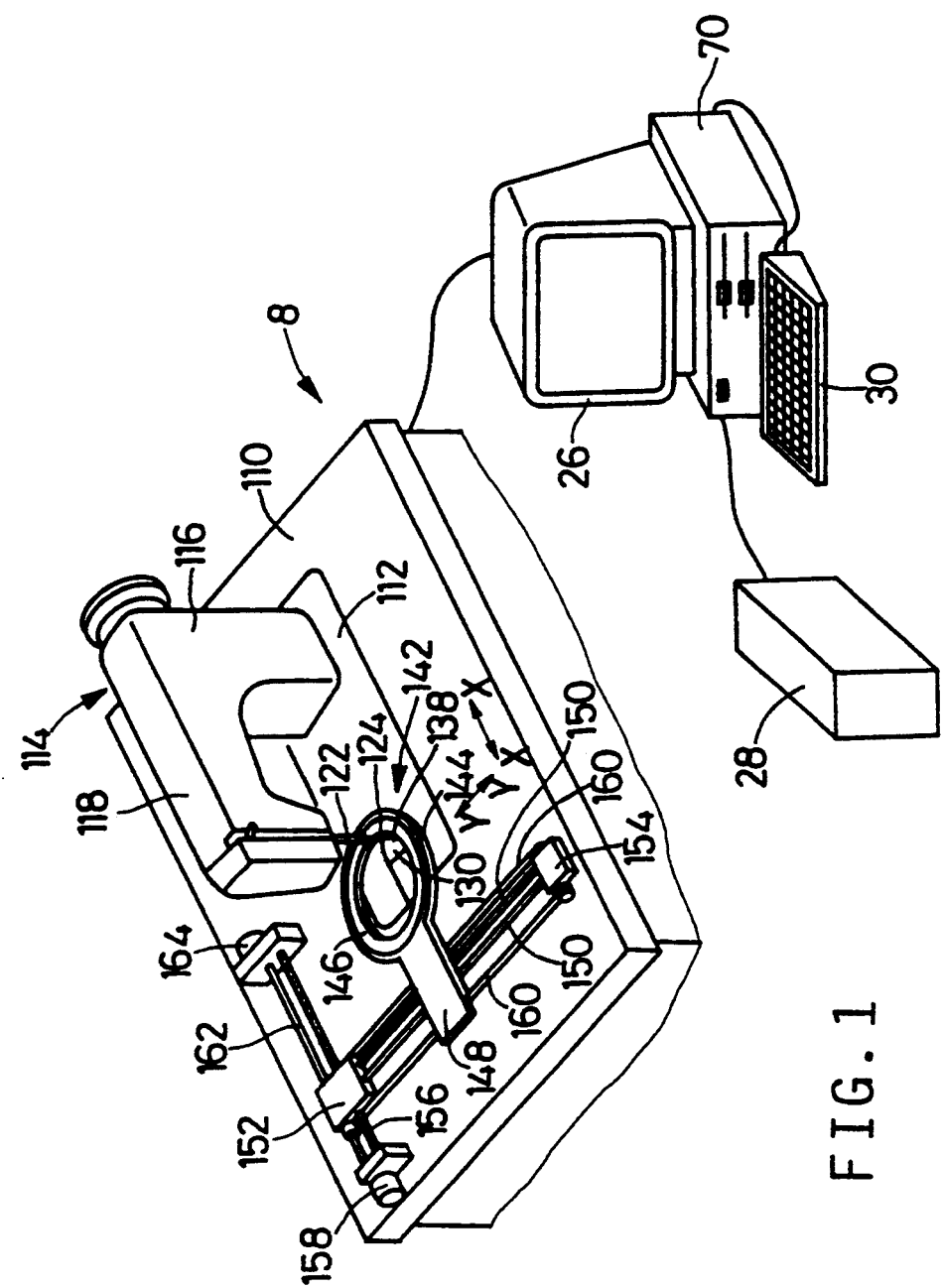
FIG. 1 is a perspective view of an embroidery sewing system including an embroidery data processing apparatus according to the present invention.

Referring first to FIG. 1, there is shown an embroidery sewing system to which the present invention is applied. The system includes a stitch forming device 8.

In FIG. 1, reference numeral 110 designates a table of the stitch forming device 8 on which a bed 112 and a main frame 114 are provided. The main frame 114 includes a column 116 extending vertically from the bed 112, and an arm 118 extending horizontally from the upper portion of the column 116 like a cantilever. A needle bar 122 is connected to the main frame 114 via a needle bar frame (not shown), such that the needle bar 122 is vertically displaceable. A needle 124 is secured to the lower end of the needle bar 122. The needle bar 122 is coupled to a main motor 126 (FIG. 3) via a needle bar connecting bracket and other members (not shown). The needle bar 122 and needle 124 are reciprocated vertically when the main motor 126 is driven. The bed 112 has an opening formed in the upper surface thereof. A throat plate 130 having a needle aperture 138, is adapted to close the opening of the bed 112. The needle 124 passes through the aperture 138 to below the plate 130, and cooperates with a shuttle or bobbin casing (not shown) to form stitches.

An embroidery frame 142 is mounted on the table 110 so as to be movable in an X and a Y direction which are perpendicular to each other. The embroidery frame 142 includes an outer frame 144 having a ring portion, and an inner annular frame 146 adapted to fit in the ring portion of the outer frame 144. The outer and inner frames 144, 146 of the embroidery frame 142 cooperate with each other to support a work fabric (not shown) therebetween. The outer frame 144 has a slide portion 148 extending from the ring portion thereof in the X direction and away from the column 116. The slide portion 148 is slidably engaged with a pair of guide pipes 150, 150 extending in the Y direction. Two pairs of corresponding opposite ends of the guide pipes 150 are supported by a first and a second support member 152, 154, respectively.

The first support member 152 is adapted to be displaced in the X direction when a feed screw 156 is rotated by an X feed motor 158. The second support member 154 is separate from the upper surface of the table 110. A pair of endless wires 160, 160 are engaged with the slide portion 148 and the first and second support members 152, 154. When a rotation transmission bar 162 is rotated by a Y feed motor 164, the wires 160 are displaced so that the slide portion 148 is displaced in the Y direction. By combination of the X direction movement of the first support member 152 and the Y direction movement of the slide portion 148, the embroidery frame 142 is moved to any position in a horizontal plane, namely, in an X-Y orthogonal coordinate system defined by the X and Y directions or axes. This embroidery frame movement cooperates with the needle reciprocatory movement to enable an embroidery pattern to be produced on the work fabric.

Figure 2:
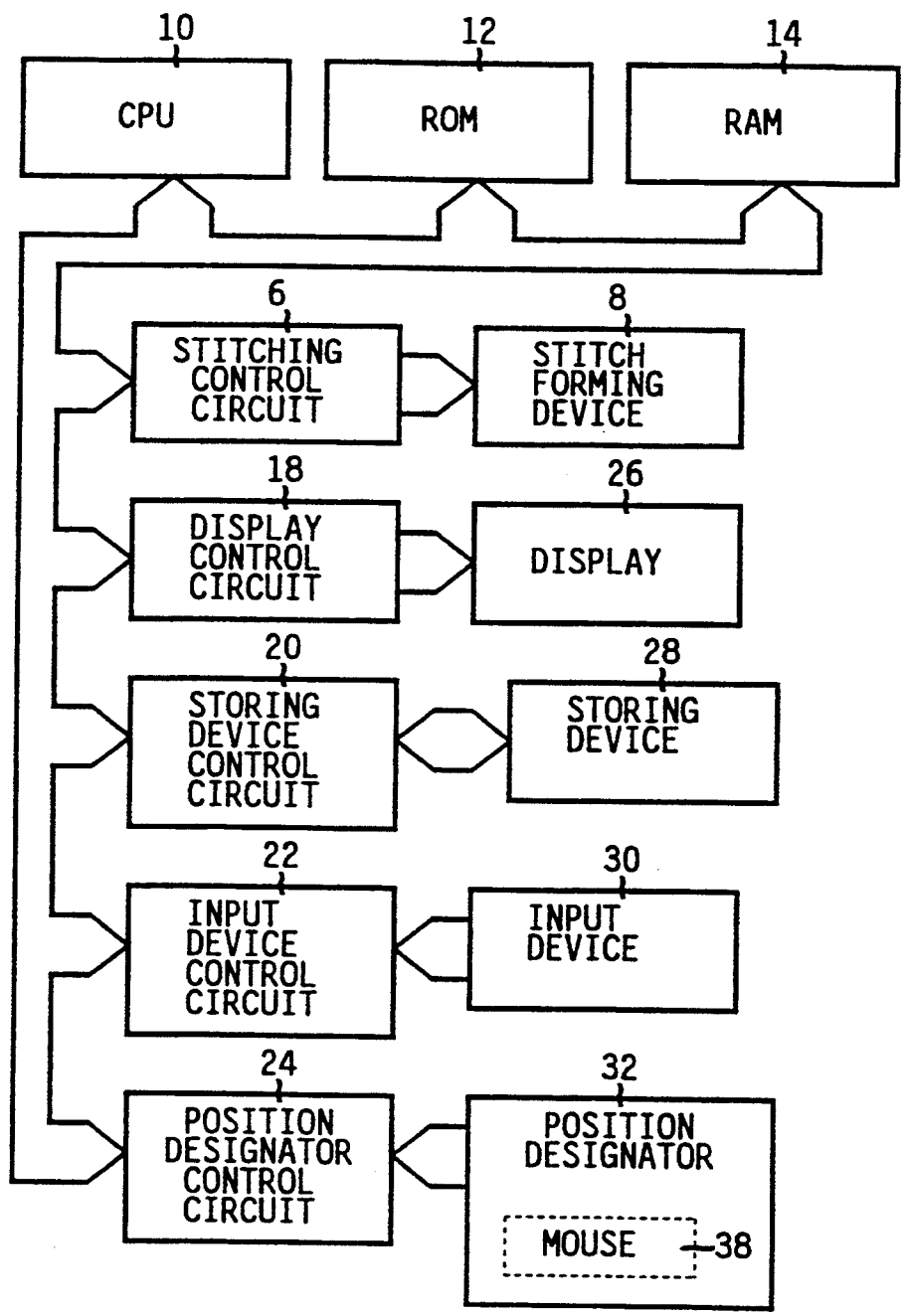
FIG. 2 is a diagrammatic view of the processing apparatus of FIG. 1.
Figure 3:
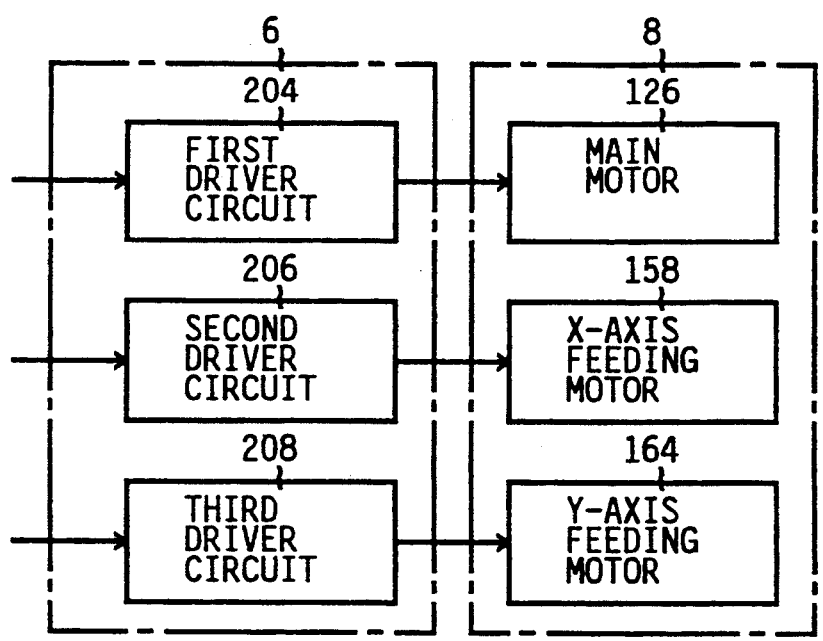
FIG. 3 is a diagrammatic view of the stitching control circuit and stitch forming device of the processing apparatus of FIG. 2.

The operation of the present embroidery sewing system is controlled by a control device 70. As shown in FIG. 2, the control device 70 essentially is constituted by a computer including a central processing unit (CPU) 10 to which a read only memory (ROM) 12 and a random access memory (RAM) 14 are connected via data bus 16 (common data transmitting conductors). To the CPU 10, are connected additional components, that is, a stitch forming device 8, a display 26, a storing device 28, an input device 30, and a position designator 32 via a stitching control circuit 6, a display control circuit 18, a storing device control circuit 20, an input device control circuit 22, and a position designator control circuit 24, respectively. As shown in FIG. 3, the stitching control circuit 6 includes a first, second, and a third drive circuit 204, 206, 208, and the stitch forming device 8 includes the main motor 126 and X and Y feed motors 158, 164.

The input device 30 includes a keyboard having a number of key switches which are operated by an operator to control the operation of the CPU 10, and an image taking device (not shown) such as a television camera or an image sensor. The display 26 includes a CRT 36 (FIG. 7) adapted to display the image taken by the image taking device. The position designator 32 includes a mouse 38 (or a light pen) used for designating a desired position on the CRT 36. The mouse 38 has a right-hand and a left-hand button (not shown) and, upon operation of each button, the mouse 30 generates an ON signal to the CPU 10. The storing device 28 stores batches of stitch data. Each batch of stitch data is indicative of stitch positions constituting a corresponding embroidery pattern, and includes data indicative of an X and a Y coordinate of each of the stitch positions. The keyboard of the input device 30 is used to select one of the batches and display an embroidery pattern 50 (FIG. 6) indicated by the selected stitch data.

The present embroidery data processing system may be operated either by being connected to the sewing machine 8, or independently thereof. In the latter case, the embroidery data after being processed by the control device 70 is stored in a storing medium such as a floppy disk or a magnetic tape, and a sewing machine has a reading device for reading the embroidery data from the storing medium.

Figure 4:
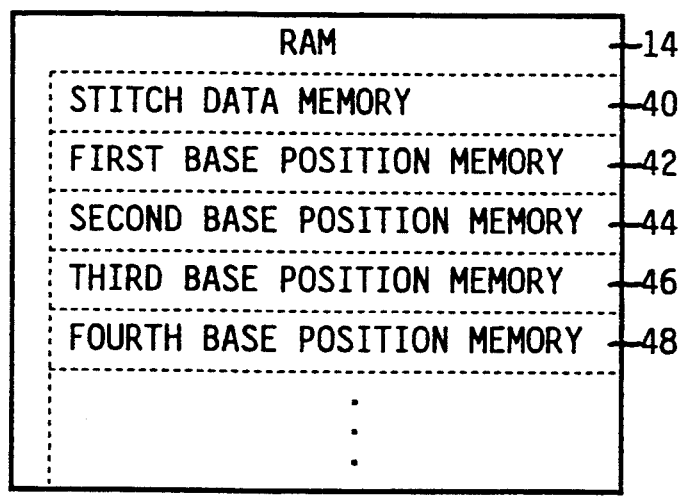
FIG. 4 is an illustrative view of a random access memory (RAM) of the processing apparatus of FIG. 2.
Figure 5:
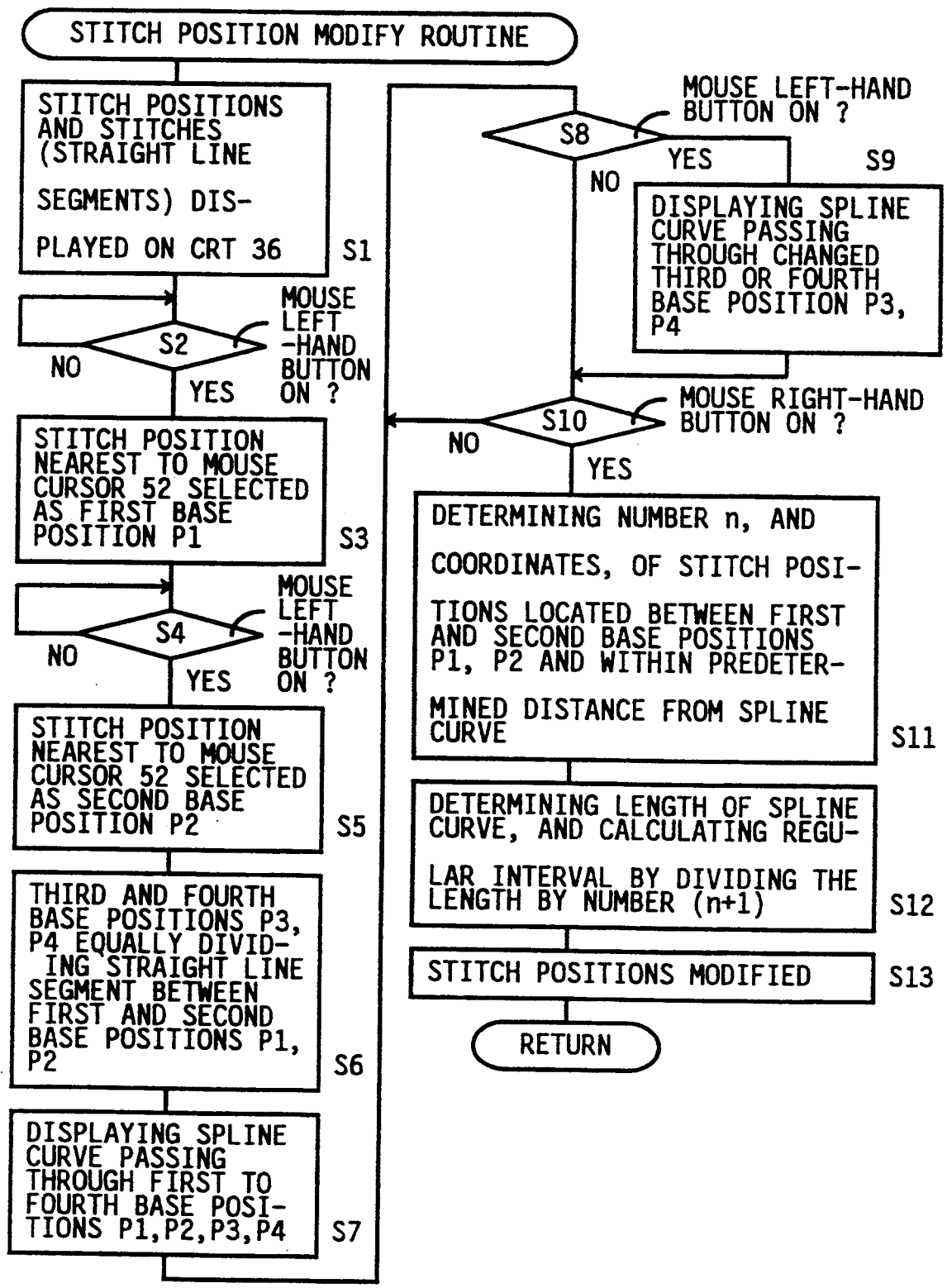
FIG. 5 is a flow chart representing the stitch position modify routine stored in a read only memory (ROM) of the processing apparatus of FIG. 2.

As shown in FIG. 4, the RAM 14 includes a stitch data memory 40 storing a batch of stitch data which, by selection thereof through operation of the keyboard, is read from a floppy disk held in the storing device 28. In addition, the RAM 14 includes a first, a second, a third, and a fourth base position memory 42, 44, 46, 48, together with a working memory (not shown). The ROM 12 stores the stitch position modify routine represented by the flow chart of FIG. 5.

Hereinafter, there will be described the operation of a processing system according to the present invention, for modifying the embroidery or sewing pattern 50, more specifically, the batch of stitch data stored in the stitch data memory 40 of the RAM 14.

Figure 6:
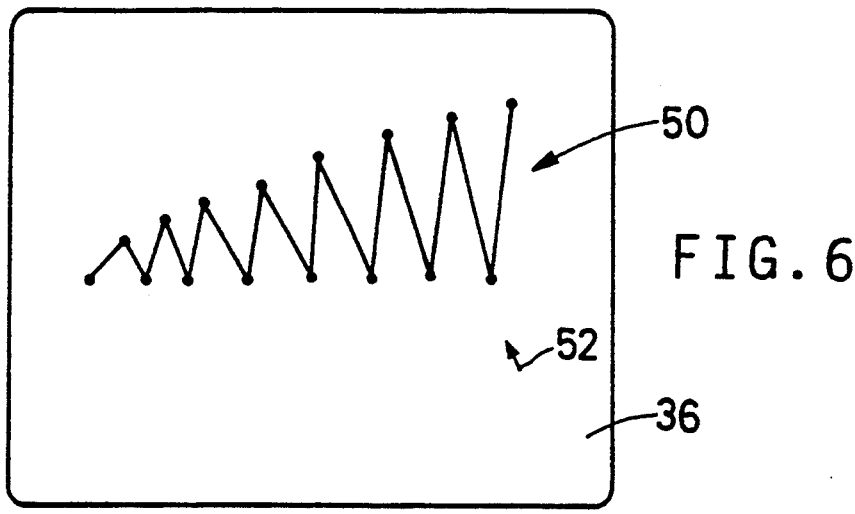
FIG. 6 is a view showing that points representing stitch positions and straight line segments representing stitches connecting between the stitch positions in a sewing order, prior to modification thereof, are displayed on a CRT display of the processing apparatus of FIG. 2.
Figure 7:
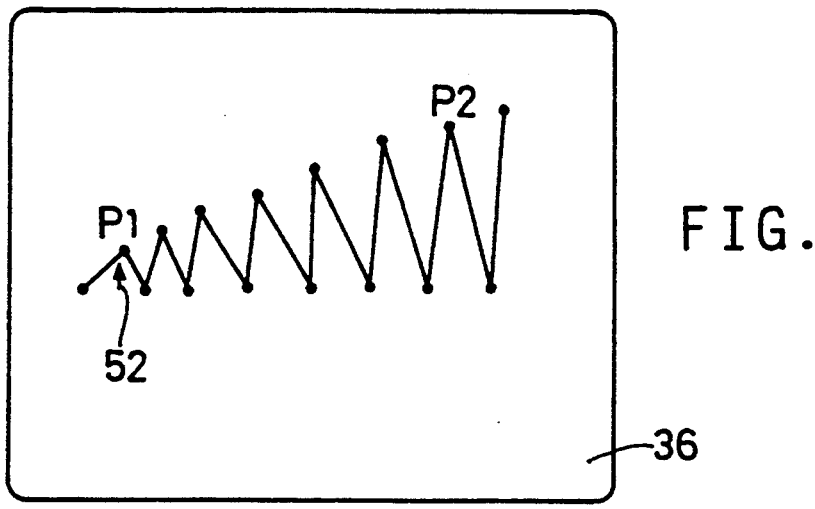
FIG. 7 is a view for illustrating the manner of specifying a portion of the stitch positions to be modified.

When an operator operates the input device 30 for starting to modify the sewing pattern 50 of FIG. 6, the control of the CPU 10 begins with Step S1 to display, on the CRT 36, points representing all the stitch positions belonging to the sewing pattern 50, and straight line segments representing stitches connecting between the stitch positions in a sewing order. Step S1 is followed by Step S2 to identify whether or not the left-hand button of the mouse 38 has been pushed to generate an ON signal. While viewing the sewing pattern 50 (points and straight line segments) on the CRT 36, the operator moves the mouse 38 and thereby displaces a mouse cursor 52, indicated at an arrow in FIG. 6, so as to designate a stitch position or point located at one end of a portion of the sewing pattern 50 which portion he or she intends to modify. If the operator pushes the left-hand button of the mouse 38, with the cursor 52 being positioned accurately on the selected stitch position, or positioned sufficiently near to the selected stitch position, an affirmative judgement (YES) is made in Step S2. In this case, the control of the CPU 10 proceeds with Step S3 to determine, as a first base position, P1, a stitch position nearest to the cursor 52 (i.e., above-indicated selected stitch position) and store, in the first base position memory 42, the data indicative of the X and Y coordinates of the first base position P1.

Subsequently, the operator moves the mouse 38 and thereby displaces the cursor 52 to designate a stitch position located at the other end of the to-be-modified portion of the sewing pattern 50. If the operator pushes the left-hand button of the mouse 38 with the cursor 52 being positioned at the desired stitch position, an affirmative judgement is made in Step S4. Then, the control of the CPU 10 goes to Step S5 to determine, as a second base position, P2 (FIG. 7), a stitch position nearest to the cursor 52 (i.e., above-indicated desired stitch position) and store, in the second base position memory 44, the data indicative of the X and Y coordinates of the second base position P2. Thus, the to-be-modified portion of the sewing pattern 50 is specified.

Figure 8:
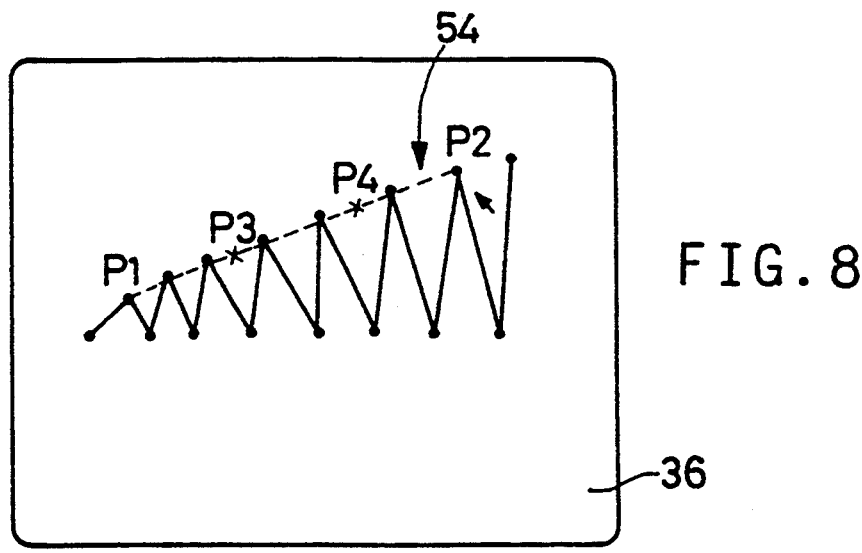
FIG. 8 is a view for illustrating the manner of providing a spline curve.

Step S5 is followed by Step S6 to determine, as a third and a fourth base position, P3 and P4 (FIG. 8), respective two positions or points which equally divide, into three parts, a straight line segment connecting between the first and second base positions P1, P2, and store, in the third and fourth base position memories 46, 48, the data indicative of the X and Y coordinates of the third and fourth second base positions P3, P4, respectively. Subsequently, the control of the CPU 10 goes to Step S7 to provide a spline function line 54 passing through the first to fourth base positions P1, P2, P3, P4, as shown in FIG. 8, and display the spline function line 54 on the CRT 36. In the present embodiment, the spline function line 54 is a cubic curve expressed by a well-known general formula. Given four particular points, it is possible to specify the coefficient of each of the term or terms of the cubic general formula, and thereby specify a particular cubic curve. For the four points P1 through P4 of FIG. 8, the spline function line assumes a straight line segment 54.

Figure 9:
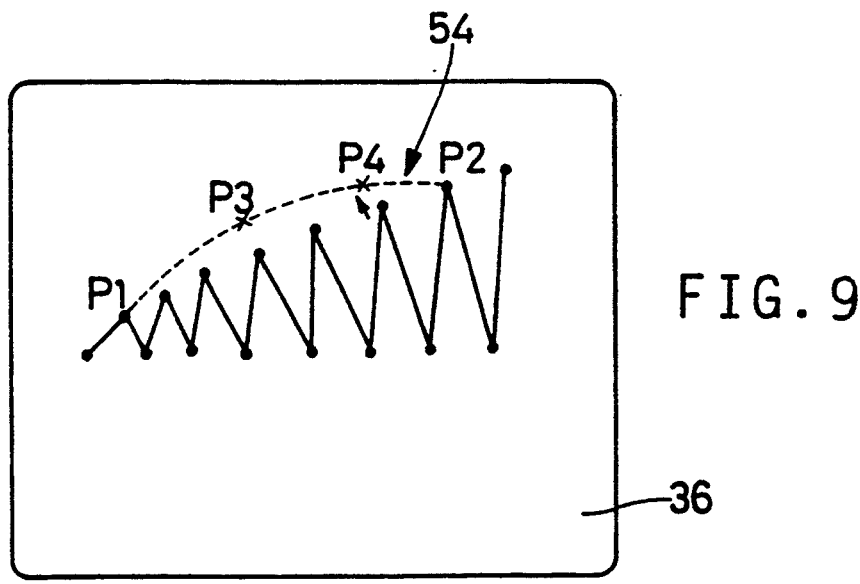
FIG. 9 is a view for illustrating the manner of modifying the spline curve of FIG. 9 to a spline curve used as a defining line.

While viewing the spline function line 54 displayed on the CRT 36, the operator changes the spline function line 54 by moving at least one of the third and fourth base positions or points P3, P4 on the CRT 36, so that the to-be-modified portion of the sewing pattern 50 is changed to a desired portion defined by the changed spline function line 54. The movement of the third or fourth base position P3, P4 is effected by moving the cursor 52 to a desired position that is nearer to one of the two base positions P3, P4 than the other and pushing the left-hand button of the mouse 38. If the left-hand button of the mouse 38 is pushed, an affirmative judgement is made in Step S8, and the control of the CPU 10 goes to Step S9 to replace the data indicative of the coordinates of the third or fourth base position P3, P4 nearer to the cursor 52, stored in the corresponding memory 46 or 48, by data indicative of the coordinates of the position where the cursor 52 currently is located. In addition, in Step S9, the present processing system provides, on the CRT 36, a new (changed) spline function line 54 passing through the four base positions P1 to P4 including the new base position P3 or P4, as shown in FIG. 9. If the thus obtained new spline function line 54 defines a satisfactory shape, the operator pushes the right-hand button of the mouse 38 for adopting the new base position P3 or P4 as a defining position. On the other hand, if not, the operator further moves the mouse 38 or cursor 52 to obtain, as a defining position, a new third or fourth base position P3 or P4.

Steps S8 through S10 are repeated until the operator reaches a satisfactory spline function line 54 on the CRT 36. If the operator obtains a satisfactory spline function line 54 and therefore pushes the right-hand button of the mouse 38, an affirmative judgement is made in Step S10. Subsequently, the control of the CPU 10 goes to Step S11 to select stitch positions located between the first and second base positions P1, P2, according to a predetermined rule, and determine a number, n, of the selected stitch positions. For example, the CPU 10 selects the stitch positions located between the first and second base positions P1, P2, such that the selected stitch positions are located between the greater and smaller X coordinates of the two base positions P1, P2 and simultaneously between the greater and smaller Y coordinates of the two base positions P1, P2, and within a predetermined distance from the spline function line 54. In Step S11, the CPU 10 stores data indicative of the number n and the data indicative of the coordinates of each of the selected stitch positions, in the working memory of the RAM 14. Since stitches for the embroidery pattern 50 are formed by alternately connecting, with a thread, between two groups of stitch positions, one of the two groups of stitch positions which is nearer to the spline function line 54, is selected as the to-be-modified portion of the embroidery pattern 50, that is, the stitch positions belonging to that portion.

Figure 10:
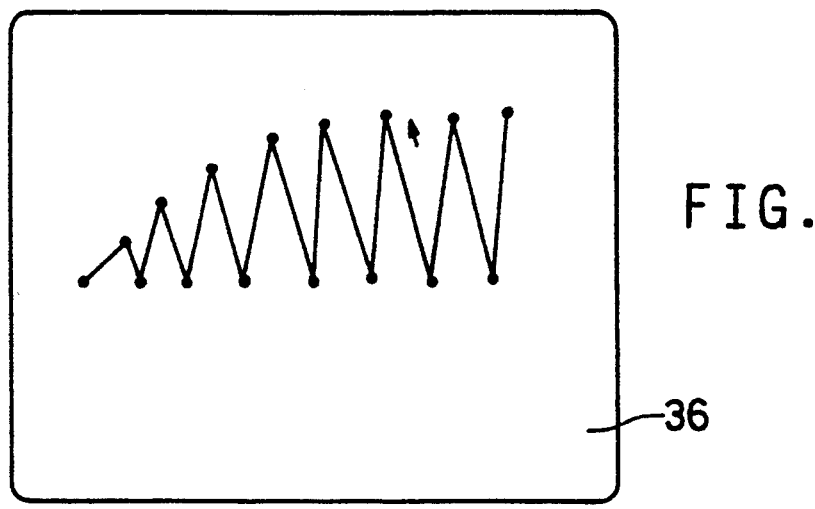
FIG. 10 is a view for illustrating the stitch positions and stitches after the modification thereof.

Step S11 is followed by Step S12 to determine a length of the spline function line 54, that is, distance between the first and second base positions P1, P2, and calculate a stitch-position regular interval, m, by dividing the determined length or distance by a number greater by one than the number n. Step S12 is followed by Step S13 to determine coordinates of n positions spaced apart from each other by the regular interval m by starting from the first base position P1 and ending at the second base position P2 on the satisfactory spline function line 54, and replace the data indicative of the coordinates of the stitch positions selected in Step S11 and stored in the RAM 14, by data indicative of the coordinates of the new n positions located on the spline function line 54. Thus, a portion of the predetermined stitch positions belonging to the original sewing pattern 50, are modified to new stitch positions on the spline function line 54, which is a smooth curve as shown in FIG. 10. The new stitch positions equally divide the smooth curve into (n+1) parts between the first and second base positions P1, P2. Thus, stitches are formed at the regular intervals m in the modified portion of the sewing pattern 50.

As is apparent from the foregoing description, in the present embodiment, the spline function line 54 serves as a defining line on which modified stitch positions are located; the storing device 28 or stitch data memory 40 serves as storing means for storing stitch data; a portion of the ROM 12 for storing Steps S1 through S10 and portions of the CPU 10 and RAM 14 for effecting those steps, cooperate with each other to serve as producing means for producing data indicative of the defining line; and a portion of the ROM 12 for storing Steps S11 through S13 and portions of the CPU 10 and RAM 14 for effecting those steps, cooperate with each other to serve as modifying means for modifying the stitch data such that at least a portion of the stitch positions are located on the defining line.

While in the present embodiment a cubic spline curve is used as the defining line, it is possible to use, as the defining line, a Bezier curve, or a quadratic or a fourth or higher degree function curve.

Although in the present embodiment a curve is used as the defining line, it is possible to use a straight line, for example as shown in FIG. 8. Even in the case where stitch positions to be modified are ones located on a predetermined curve, it is possible to modify those stitch positions by using one or more straight defining lines, in such a manner that the predetermined curve is divided into straight line segments which cooperate with each other to approximate the curve, that one of the two points defining each of the straight line segments is moved to a new position where the one point and the other point cooperate with each other to define a straight defining line, and that stitch positions belonging to the each of the straight line segments are moved onto the straight defining line.

While the present embodiment has been described with respect to the case where a portion of the stitch positions belonging to a sewing pattern are modified, it is possible to modify all stitch positions of a sewing pattern.

Furthermore, although the illustrated processing system is adapted to modify all the stitch positions located between the first and second base positions P1, P2, it is possible to adapt the processing system to modify a portion of those stitch positions, for example, alternate ones of those stitch positions.

In addition to the modification of embroidery stitch data, the present invention is applicable to modification of various sorts of stitch data for button hole sewing, zigzag sewing, straight sewing, etc.

It is to be understood that the present invention may be embodied with various changes, modifications and improvements that may occur to those skilled in the art without departing from the spirit and scope of the invention defined in the appended claims.

What is claimed is:

1. An apparatus for processing sewing data used by a sewing machine, comprising:

storing means for storing stitch position data indicative of stitch positions adapted to be penetrated by a sewing machine of said sewing machine to form stitches into a work sheet;

a display which displays straight line segments connecting points representing said stitch positions in a sewing order;

producing means for producing data indicative of a defining line;

modifying means for modifying said stitch position data such that a portion of said stitch positions are modified stitch positions that are located on said defining line and a portion of said stitch positions are unmodified stitch positions that are located off said defining line, such that said modified stitch positions alternate with said unmodified stitch positions, said display displaying straight line segments connecting each of the modified stitch positions located on said defining line with a preceding and a following one of the unmodified stitch positions located off said defining line in said sewing order; and a data utilization device which utilizes said stitch position data modified by said modifying means, to form said stitches into said work sheet.

2. The apparatus as set forth in claim 1, wherein said storing means stores batches of stitch position data, each of said batches of stitch position data indicating stitch positions constituting a corresponding sewing pattern, said producing means comprising means for selecting one of the sewing patterns indicated by said batches of stitch position data, said display means displaying points and straight line segments representing the selected sewing pattern.

3. The apparatus as set forth in claim 1, wherein said producing means comprises:

means for selecting a first stitch position from said stitch positions displayed by said display;

means for selecting a second stitch position from said stitch positions; and means for locating at least one base position between said first and second stitch positions.

4. The apparatus as set forth in claim 3, wherein said producing means further comprises means for storing data indicative of said first and second stitch positions and said at least one base position.

5. The apparatus as set forth in claim 3, wherein said at least one base position consist of two base positions, said producing means further comprising means for determining a cubic spline function line so as to pass through said first and second stitch positions and said two base positions.

6. The apparatus as set forth in claim 3, wherein said display displays said at least one base position located between said first and second stitch positions and wherein said producing means further comprises changing means for changing said at least one base position to at least one defining position; and determining means for determining said defining line so as to pass through said first and second stitch positions and said at least one defining position, said display displaying said defining line determined by said determining means.

7. The apparatus as set forth in claim 6, wherein said at least one base position consist of two base positions, said changing means changing at least one of said two base positions to at least one defining position, said determining means determining a cubic spline function line so as to pass through said first and second stitch positions and said at least one defining position.

8. The apparatus as set forth in claim 6, wherein said determining means determines, as said defining line, a straight line connecting between each pair of adjacent positions of said first and second stitch positions and said at least one defining position.

9. The apparatus as set forth in claim 3, wherein said modifying means comprises:
    selecting means for selecting, as said at least portion of said stitch positions, stitch positions located between said first and second stitch positions, according to a predetermined rule, and determining a number of the selected stitch positions as a first number;
    calculating means for determining a distance between said first and second stitch positions, determining a second number based upon said first number, and calculating a regular interval by dividing said distance by said second number;
    means for locating new stitch positions on said defining line by utilizing said regular interval and at least one of said first and second stitch positions, and replacing said selected stitch positions by said new stitch positions.

10. The apparatus as set forth in claim 9, wherein said storing means stores, as said stitch position data, an X and a Y coordinate of each of said stitch positions, said selecting means selecting the stitch positions located between said first and second stitch positions, such that the selected stitch positions are located between the greater and smaller X coordinates of said first and second stitch positions and simultaneously between the greater and smaller Y coordinates of the first and second stitch positions, and within a predetermined distance from said defining line, said calculating means determining said second number by adding one to said first number.

11. The apparatus as set forth in claim 1, wherein said data utilization device comprises a stitch-forming device including said sewing needle of said sewing machine, said stitch-forming device forming said stitches into said work sheet according to said stitch position data modified by said modifying means.

12. The apparatus as set forth in claim 1, wherein said data utilization device comprises a data storing device which stores, in a storing medium, said stitch position data modified by said modifying means.

13. The apparatus as set forth in claim 12, wherein said data storing device stores the modified stitch position data in a floppy disk as said storing medium so that said floppy disk is removed from the data storing device and is used with said sewing machine including said sewing needle to form said stitches into said work sheet.

* * * * *